United States Patent Office 2,745,688
Patented May 15, 1956

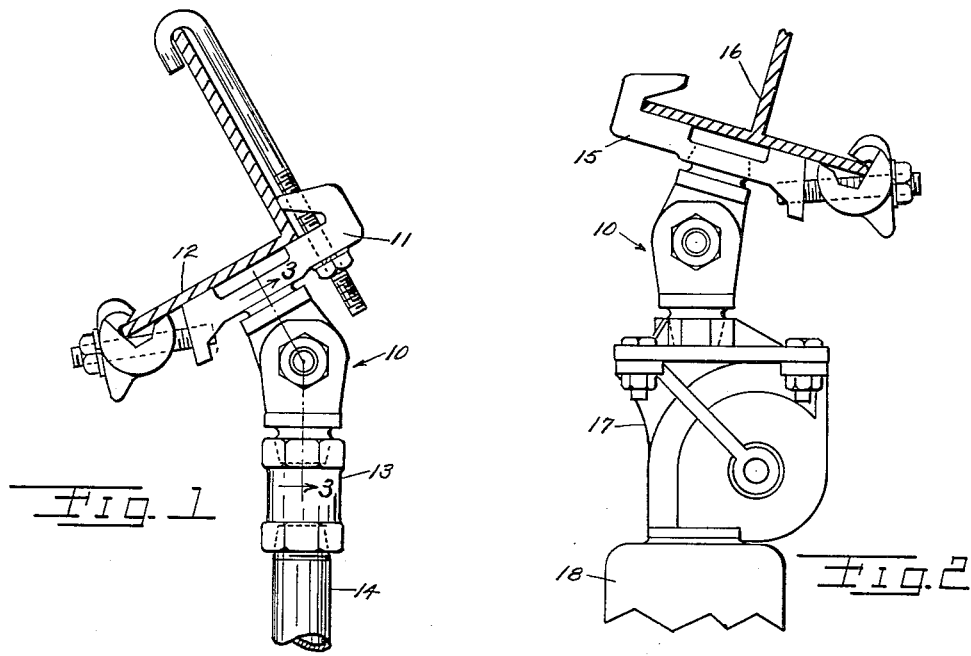
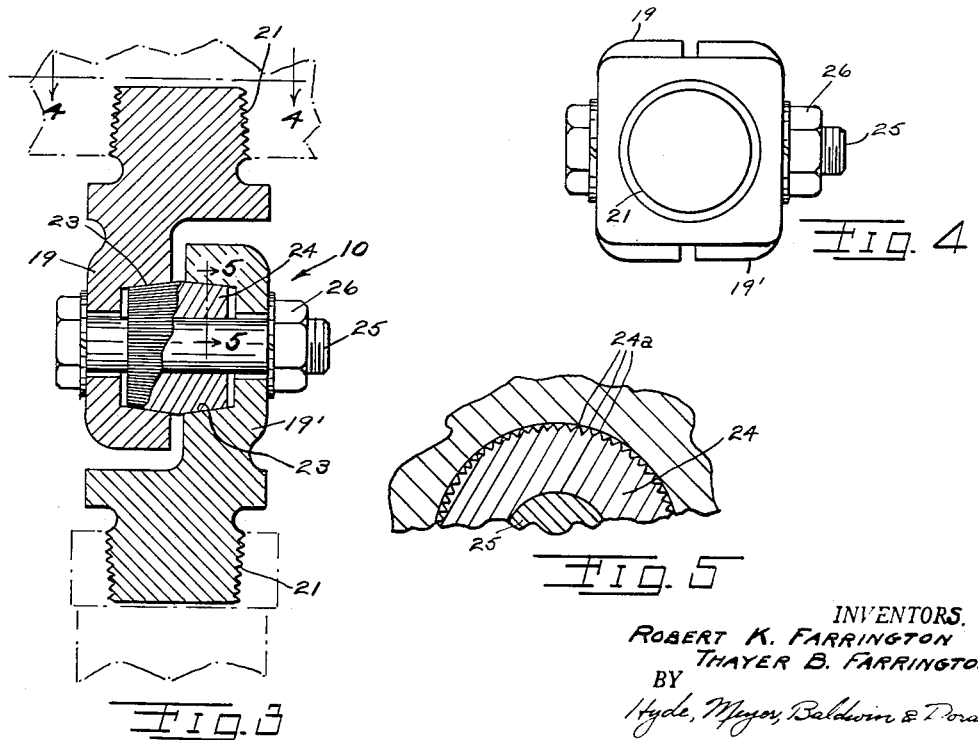

2,745,688

SOLID ADJUSTABLE ANGLE FITTING

Robert K. Farrington, Shaker Heights, and Thayer B. Farrington, Cleveland Heights, Ohio, assignors to The Thompson Electric Company, Cleveland, Ohio, a corporation of Ohio Application February 27, 1951, Serial No. 212,906

1 Claim. (Cl. 287—14)

This invention relates to an adjustable angle fitting for suspending one object below another and where various angles are encountered so that an adjustable fitting is required.

This application is a continuation in part of our copending application Serial No. 89,932, filed April 27, 1949, for Adjustable Angle Fitting, now abandoned, to which reference may be had for a description of modifications of the device described herein.

An object of the present invention is to provide an angle fitting of the type described, adapted to be assembled at various angles, and assembled together in a fixed relationship by a frusto-conical plug frictionally held in mutually facing conical recesses of the two parts of the angle fitting.

Another object of the present invention is to provide a novel arrangement of the securing plug whereby serrated ribs of the frusto-conical plug bite into the smooth conical recesses of the fittings so as to hold them firmly secured.

Further objects of the present invention comprise the forming of the angularly adjustable members of solid material giving a very strong construction, the use of identical adjustable fittings thus dispensing with the manufacture of right- and left-hand members, and other features which are more clearly described in the specification and illustrated in the drawings. The essential features of our invention will be set forth in the appended claim.

In the drawings,

Fig. 1 is a side elevational view of our improved fitting clamped to a structural angle and supporting a pipe-like member beneath it;

Fig. 2 shows our improved fitting in side elevational view clamped to an I-beam and supporting a known type of lamp hanger beneath it;

Fig. 3 is an enlarged fragmental sectional view taken along the line 3—3 of Fig. 1;

Fig. 4 is an end elevational view taken along the line 4—4 of Fig. 3; while

Fig. 5 is an enlarged fragmental sectional view taken along the line 5—5 of Fig. 3.

It is often desirable to support fixtures from inclined structural members so that the fixture will be suspended vertically below the inclined support. In such a case, an angularly adjustable fitting is required, and it is desirable to manufacture a single fitting which can be adjusted to various angles as required in the field.

As shown in Fig. 1, the angular fitting 10 has one end threaded into a clamp 11 which in turn embraces the structural angle 12. Below the fitting 10 is provided a coupling 13 which in turn is connected with a length of pipe 14.

In Fig. 2 another application of our invention is shown where the angular fitting 10 is threaded into a clamp 15 which in turn is fixed to an I-beam 16. Below the angle fitting is a lamp hanger 17 of known type which is in this instance held with its shade or reflector 18 pointing directly downwardly.

The angular fitting 10 is more clearly understood from Fig. 3. A casting or stamping or forging is provided having an adjustable angle connecting end 19 off-center from an attachment end here embodied in a threaded connection 21. Obviously, any form of connection might be provided here but a male thread connection is quite commonly used. The adjustable angle connecting end is provided with a transversely extending frusto-conical recess 23 opening toward the axis of the threaded connection 21. The member 19' may be exactly like the member 19 in every respect only turned in the opposite direction. A plug 24 is provided adapted to be received snugly into the recesses 23 of the members 19 and 19'. The plug 24 has its greatest diameter at its midportion and tapers from that zone toward each end. The recesses 23 are tapered at a corresponding angle so that as the parts are pulled together a wedging action takes place. A bolt 25 extends through suitable openings in the members 19, 19' and 24. A nut 26 holds the parts in clamped relation.

The plug 24 may have plain frusto-conical sides as in our copending application and will function in a fairly efficient manner to hold the members 19 and 19' at any adjusted angle between them. However, we prefer to provide on the inclined frusto-conical faces of the plug 24 a plurality of serrated ribs 24a extending along the slant height of the frusto-conical surfaces. These serrations 24a have relatively sharp ridges so that when the parts are pulled together by means of nut 26 threaded on bolt 25, as seen in Fig. 3, the ribs 24a will bite into the smooth surfaces of the recesses 23. Preferably, if desired, the plug 24 may be made of harder material than the walls of recesses 23 or the plug 24 may be case hardened, or it may be provided with a hardened coating on the serrated exteriors thereof. It results from this improved construction, that when the fitting 10 is adjusted to the desired angle, and nut 26 is drawn up firmly on bolt 25, the serrated ribs 24a bite into the smooth recesses 23 and hold the parts firmly adjusted in their angular relationship.

It will be noted that the threaded connections 21 provide means for attaching the members 19 and 19' to supporting and supported members on opposite sides of the angle fitting. Other attaching means, not threaded, might be provided for this attachment, but it is the general purpose of our angle fitting to attach the member 19 to a supporting member and to connect the member 19' with a device to be supported below the angle fitting.

What we claim is:

Suspension joint means for an angularly adjustable support, comprising a pair of fittings each having an attachment end and an adjustable angle connecting end off-center from the axis of the attachment end, each adjustable angle connecting end having a transversely extending frusto-conical recess in a wall thereof, said recesses in said pair of fittings opening toward each other, a plug disposed between the fittings and having two opposed projecting frusto-conical portions extending respectively into said recesses, the inner surface of each recess having a taper converging toward the bottom of the recess and each said projecting portion being correspondingly tapered to fit its respective recess whereby to permit angular adjustment of each of said fittings on said plug, the inner surfaces of said recesses and the outer surfaces of said projecting portions being portions of cones having the same acute vertex angle, there being aligned holes through said fittings substantially coaxial with said plug, and adjustable connecting means extending axially through said plug and outwardly through said aligned holes in said fitting whereby said fittings may be drawn tightly towards each other on the opposed tapered portions of said plug, the off-center position of said adjustable angle connecting ends permitting said fittings to be assembled on said plug with said attachment ends axially aligned.

References Cited in the file of this patent

UNITED STATES PATENTS

| | | |
|---|---|---|
| 359,394 | Jones et al. | Mar. 15, 1887 |
| 566,360 | White | Aug. 25, 1896 |
| 926,426 | Koch et al. | June 29, 1909 |
| 978,323 | Mellin et al. | Dec. 13, 1910 |
| 1,089,337 | Graham | Mar. 3, 1914 |
| 1,552,569 | Schurman | Sept. 8, 1925 |
| 1,787,017 | Paul | Dec. 30, 1930 |
| 2,164,846 | Thompson | July 4, 1939 |
| 2,488,642 | Schaal | Nov. 22, 1949 |

FOREIGN PATENTS

| | | |
|---|---|---|
| 15,019 | Great Britain | 1897 |
| 150,955 | Great Britain | Sept. 16, 1920 |
| 162,831 | Great Britain | May 12, 1921 |
| 232,547 | Great Britain | Jan. 25, 1926 |